United States Patent
Haseno

(10) Patent No.: US 6,546,475 B1
(45) Date of Patent: Apr. 8, 2003

(54) DISC CONTROLLER, DISC CONTROL SYSTEM, AND DISC CONTROLLING METHOD

(75) Inventor: Shinichi Haseno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/556,076

(22) Filed: Apr. 21, 2000

(30) Foreign Application Priority Data

Apr. 23, 1999 (JP) .......................................... 11-117125

(51) Int. Cl.⁷ .............................................. G06F 12/00
(52) U.S. Cl. ........................ 711/167; 711/112; 711/117; 710/52; 714/6
(58) Field of Search ................................ 711/112, 117, 711/118, 167; 714/6; 710/52

(56) References Cited

U.S. PATENT DOCUMENTS

| 4,607,328 A | * | 8/1986 | Furukawa et al. | .......... 711/109 |
| 4,716,522 A | * | 12/1987 | Funabashi et al. | .......... 708/142 |
| 4,984,103 A | * | 1/1991 | Nigam | .......... 360/121 |
| 5,276,662 A | | 1/1994 | Shaver, Jr. et al. | |
| 5,465,338 A | | 11/1995 | Clay | |
| 5,687,389 A | | 11/1997 | Packer | |
| 5,881,248 A | * | 3/1999 | Mergard | .......... 710/100 |
| 6,055,603 A | * | 4/2000 | Ofer et al. | .......... 711/113 |
| 6,092,145 A | * | 7/2000 | Kigami et al. | .......... 711/111 |
| 6,092,231 A | * | 7/2000 | Sze | .......... 714/758 |

FOREIGN PATENT DOCUMENTS

| DE | 33 03 627 | 8/1984 |
| JP | 54 050 244 | 4/1979 |
| JP | 58 051 367 | 3/1983 |
| JP | 61 049 229 | 11/1986 |

\* cited by examiner

Primary Examiner—Hiep T. Nguyen
(74) Attorney, Agent, or Firm—Frommer Lawrence & Haug LLP; William S. Frommer; Bruno Polito

(57) ABSTRACT

In the disc controlling system, a buffer memory stores sector by sector data read from a disc or data to be written to the disc. A memory controller allows a floppy disc drive to intermittently read sector by sector data from the disc for supply to the buffer memory or intermittently write sector by sector to the disc data supplied from the buffer memory. When the floppy disc drive is not writing data to or reading data from the disc, data read from the disc is supplied sector by sector from the buffer memory to the system bus or data to be written to the disc is supplied sector by sector to the buffer memory from the system bus.

18 Claims, 5 Drawing Sheets

DISC CONTROLLER, DISC CONTROL SYSTEM, AND DISC CONTROLLING METHOD

BACKGROUND OF THE INVENTION

1. Field of the Invention

The present invention relates to a controller, control system and a controlling system for a disc such as floppy disc or the like, and more particularly, to a disc controller, disc control system and a disc controlling method, adapted for transfer of data held in the disc controller to and from a central processing unit.

2. Description of the Related Art

The floppy disc controller (will be referred to as "FDC" hereinafter) transfers data in bytes between the central processing unit (will be referred to as "CPU" hereinafter) and a floppy disc drive (will be referred to as "FDD" hereinafter) which reads and writes data from and to a floppy disc.

Normally, since the FDD reads data from, and writes data to, a disc at a transfer speed of about 60 kB/s, the CPU has to transfer data at every 16 $\mu$s to and from the FDD. The FDC will supply data read from the disc to a memory via a system bus at every about 16 $\mu$s. Also the FDC will receive data to be written by the FDD to the disc from the memory via the system bus at every about 16 $\mu$s, and supply it to the FDD. Therefore, the system bus will be occupied at every about 16 $\mu$s for data transfer between the FDC and CPU.

The above data transfer will not catch up with the disc rotation speed unless the data transfer is repeated frequently for a long time and also operations are done at a rather high speed each time a request for data transfer is received from the FDC. Further, the period for the data transfer request includes a few percent jitter incidental to the disc rotation.

Therefore, for implementation of the above data transfer, the CPU should have a considerably large processing capability including an overhead for interrupt operation. Generally, the currently available FDC has a DMA (Direct Memory Access) data transfer mechanism to prevent the CPU from being overloaded.

The time for which the system bus is occupied for data transfer between the FDC and floppy disc in the FDD system will be described with reference to FIG. 1 showing the occupied states of the system bus during data transfer.

As shown in FIGS. 1A and 1B, the track on the floppy disc is divided into a plurality of sectors. Each sector records a predetermined byte count of data. Also, address information, error correction signal, gap for protection of each data area against a variation of the floppy disc rotation are provided before and after each byte string. The FDC sends to and receives from the CPU a data being in a burst status in which the data is divided in sectors.

While the system bus is being thus occupied, the FDC reads and writes data from and to the floppy disc at a speed corresponding to the rotation speed of the floppy disc and it can read data even while the floppy disc is rotating at a nonuniform speed.

The above DMA data transfer permits to reduce the amount of data to be processed by the CPU. However, since the system bus is occupied for data transfer between the FDC and memory at every about 16 $\mu$s, the load to the entire system remains still large. In addition, though the CPU can process data while the DMA data transfer mechanism is transferring other data, the system bus is occupied by the DMA, FDC, etc.

OBJECT AND SUMMARY OF THE INVENTION

It is therefore an object of the present invention to overcome the above-mentioned drawbacks of the prior art by providing a disc controller, disc control system and a disc controlling method system, adapted to considerably reduce the load to the disc controller and system bus by effecting at an appropriate time the data transfer made between the disc controller and memory, etc. and which takes a relatively long time.

According to the present invention, there is provided a disc controller for controlling the operation of a disc drive which reads and writes data from and to a disc, comprising:

means for storing data read from the disc and supplied from the disc drive or external data supplied via a bus for write to the disc, in units of a predetermined data amount being a unit in which the data is to be read from or written to the disc; and means for controlling the data read and write from and to the disc;

the controlling means intermittently reading the data for supply to the storing means from the disc in units of the predetermined data amount, and intermittently writing to the disc the data supplied from the storing means in units of the predetermined data amount; and while the disc drive is not reading or writing data from or to the disc, the controlling means supplying the data read from the disc and stored in the storing means to the bus in units of the predetermined data amount, and supplying the data for write to the disc from the bus to the storing means in units of the predetermined data amount.

According to the present invention, there is also provided a disc control system for controlling a disc drive, comprising a disc controller and memory connected to each other by a bus, the disc controller controlling write of data stored in the memory to a disc and read of data from the disc for storage into the memory, the disc controller comprising:

means for storing data read from the disc and supplied from the disc drive or external data supplied via a bus and which is to be written to the disc, in units of a predetermined data amount being a unit in which the data is to be read from or written to the disc; and means for controlling the data read and write from and to the disc;

the controlling means intermittently reading the data for supply to the storing means from the disc in units of the predetermined data amount, and intermittently writing to the disc the data supplied from the storing means in units of the predetermined data amount; and while the disc drive is not reading or writing data from or to the disc, the controlling means supplying the data read from the disc and stored in the storing means to the bus in units of the predetermined data amount, and supplying the data for write to the disc from the bus to the storing means in units of the predetermined data amount.

According to the present invention, there is also provided a disc controlling method of controlling the operation of a disc drive which reads and writes data from and to a disc, the method comprising the steps of:

storing data read from the disc and supplied from the disc drive or external data supplied via a bus and which is to be written to the disc, in units of a predetermined data amount being a unit in which the data is to be read from or written to the disc;

intermittently reading the data for supply to the storing means from the disc in units of the predetermined data amount, or intermittently writing to the disc the data supplied from the storing means in units of the predetermined data amount; and supplying the data read from the disc and stored in the storing means to the bus in units of the predetermined data amount, and supplying the data for write to the disc from the bus to the storing means in units of the predetermined data amount, while the disc drive is not reading or writing data from or to the disc.

As having been described in the foregoing, the disc controller, disc control system and disc controlling method according to the present invention advantageously reduce the load to the central processing unit and system bus very much by effecting data transfer between the disc controller and memory, which takes a relatively long time, by using the storing means holding the same data capacity as the data amount per sector.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1A:
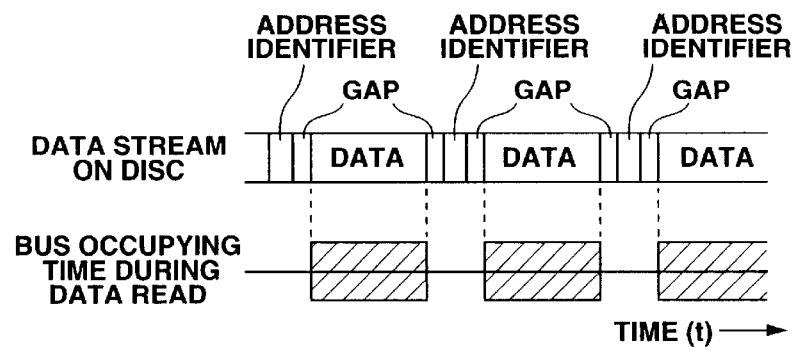
FIG. 1 shows the occupied states of the system bus during data transfer under the control of the conventional floppy disc controller.
Figure 1B:
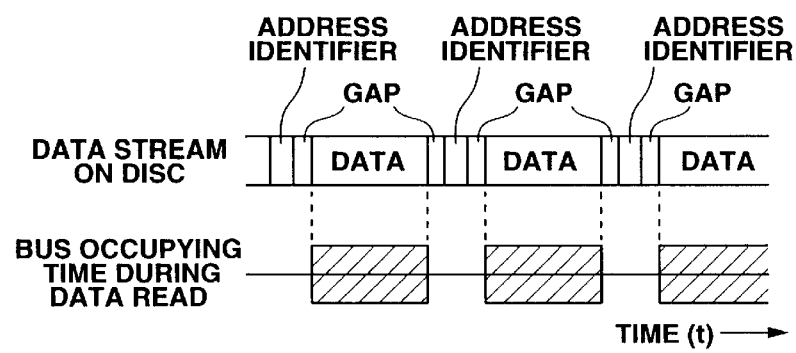
Figure 2:
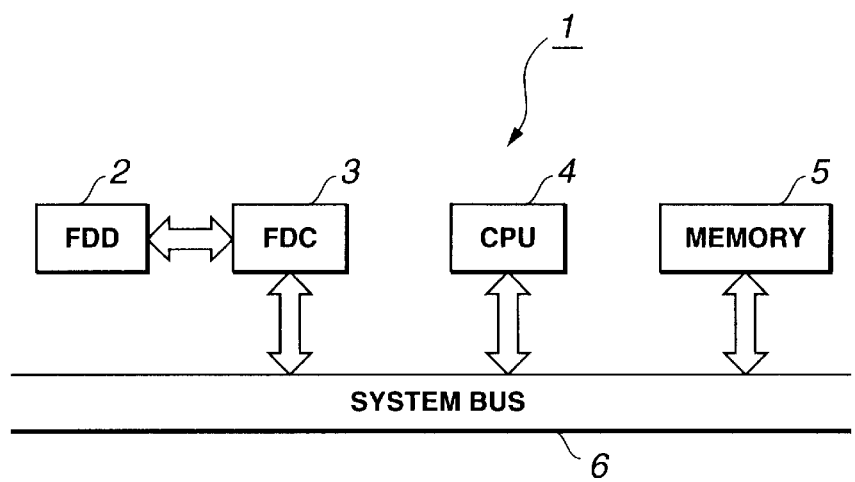
FIG. 2 is a block diagram of a floppy disc drive system including the floppy disc controller according to the present invention.

Referring now to FIG. 2, there is schematically illustrated in the form of a block diagram a floppy disc drive (FDD, hereafter) system including the floppy disc controller (FDC, hereafter) according to the present invention.

The FDC is generally indicated with a reference 1. As shown in FIG. 2, the FDC 1 includes an FDD 2 to write and read data to and from a floppy disc, an FDC 3 to control the operation, etc. of the FDD 2 based on a signal supplied via a system bus 6 from a central processing unit (CPU, hereinafter) 4 which allows the FDC 3 to effect a variety of operations, and a memory 5 to store data the FDD 2 has read from the floppy disc or data the FDD 2 writes to the floppy disc. The system bus 6 connects the FDC 3, CPU 4 and memory 5 to each other.

According to control information from the FDC 3, the FDD 2 writes data to the floppy disc or reads data from the floppy disc. More particularly, in accordance with control information from the FDC 3, the FDD 2 intermittently reads data sector by sector from the floppy disc. Each sector is a unit for a predetermined amount of data. The FDD 2 will supply the data read sector by sector from the floppy disc to a buffer memory 14 via a demodulator 11 which will further be described later. Under the control of the FDC 3, the FDD 2 intermittently writes sector by sector to the floppy disc data supplied from the buffer memory 14 via a CRC generator 16 and modulator 17.

As mentioned above, the sector is the unit for the predetermined amount of data for write to, or for read from, the floppy disc, In addition, each sector has an ID field in which information indicative of the beginning and address of the sector and a data field in which data is recorded.

According to control information from the CPU 4, the FDC 3 allows the FDD 2 to write data to the floppy disc or read data from the floppy disc. More specifically, under the control of the CPU 4, the FDC 3 allows the FDD 2 to intermittently read data sector by sector from the floppy disc and supply the data read sectors of data to the memory 5 via the system bus 6. Also, under the control of the CPU 4, the FDC 3 allows the FDD 2 to intermittently write sector by sector to the floppy disc the data supplied from the memory 5 via the system bus 6.

As mentioned above, the CPU 4 supplies the FDC 3 with information for requesting the FDD 2 to read data from the floppy disc or write data to the floppy disc.

More specifically, the CPU 4 supplies the FDC 3 with information for requesting the FDD 2 to read data from the floppy disc. Receiving the request information, the FDC 3 will allow the FDD 2 to read the data from the floppy disc. Also, the CPU 4 supplies the FDC 3 with information for requesting the FDD 2 to write data to the floppy disc. Receiving the request information, the FDC 3 will allow the FDD 2 to write the data to the floppy disc.

The memory 5 stores data having been read by the FDD 2 from the floppy disc and supplied from the FDC 3 via the system bus 6 or data supplied to the FDC 3 via the system bus 6 for write by the FDD 2 to the floppy disc.

The system bus 6 is a route along which information is transferred from any of a plurality of information sources to any of a plurality of information destinations. More particularly, the system bus 5 helps in data transfer among the FDC 3, CPU 4 and memory 5.

Figure 3:
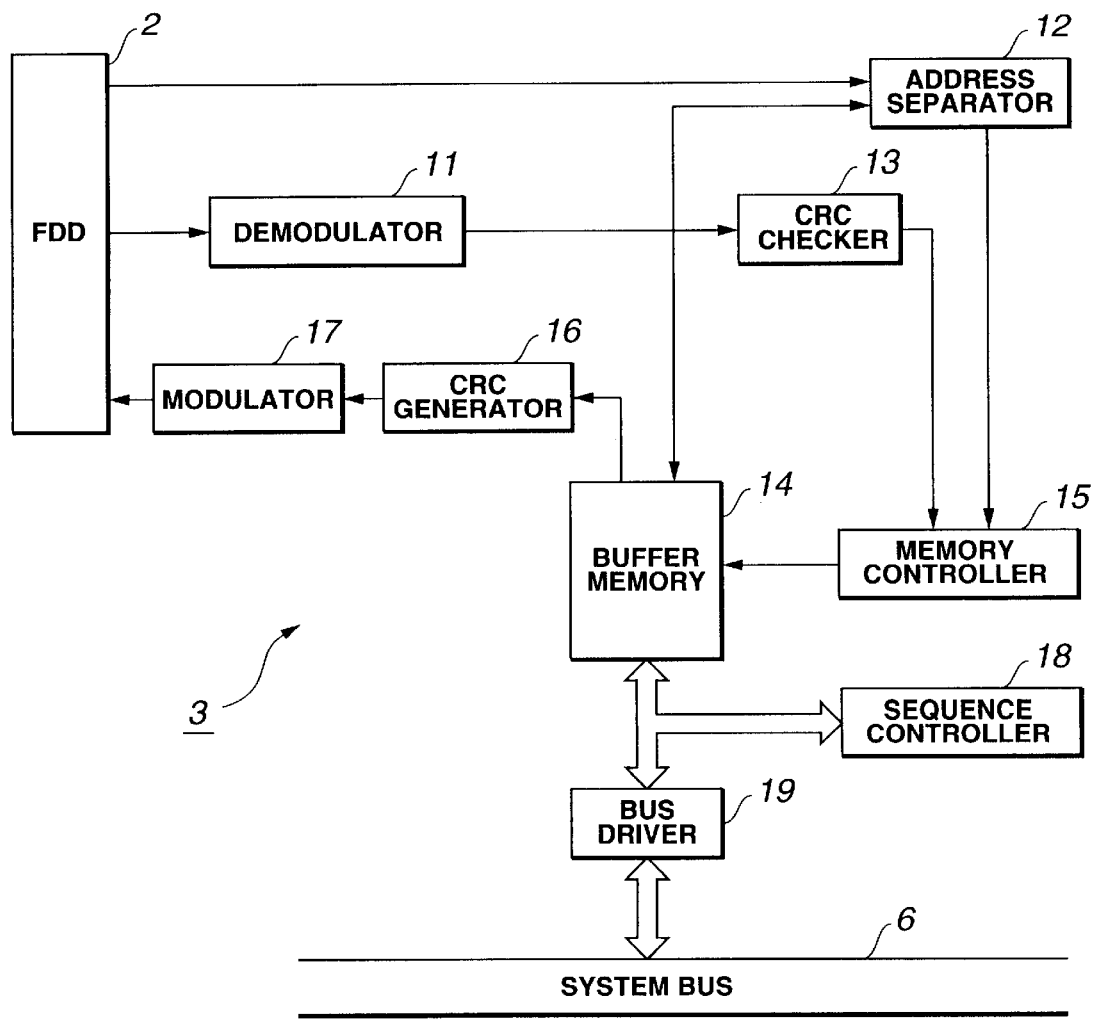
FIG. 3 is a block diagram of the floppy disc controller according to the present invention.

Referring now to FIG. 3, there is schematically illustrated in the form of a block diagram the floppy disc controller (FDC 3) according to the present invention.

As shown in FIG. 3, the FDC 3 includes a demodulator 11 to demodulate data supplied from the FDD 2, an address separator 12 to extract address information from the data supplied from the demodulator 11, a CRC (Cyclic Redundancy Check) check circuit 13 to compute CRC contained in the data supplied from the demodulator 11 for checking for any error in the data, a buffer memory 14 having a data storage capacity for at least one sector of data for data transfer between the FDD 2 and CPU 4, a memory controller 15 to control read and write of data supplied to the buffer memory 14 or data supplied from the buffer memory 14 to the memory 5, etc., a CRC generator 16 to compute in a predetermined manner data supplied from the buffer memory 14, a modulator 17 to modulate data supplied from the CRC generator 16, a sequence controller 18 to control the operation of the whole FDC 3 based on a command supplied from the CPU 4 via the system bus 6, and a bus driver 19 serving as an interface between the system bus 6 and FDC 3.

The demodulator 11 demodulates a serial data having been read by the FDD 2 from the floppy disc and supplied from the FDD 2 to a parallel data in bytes, and supplies the demodulated parallel data to the address separator 12, CRC check circuit 13 and buffer memory 14.

The address separator 12 extracts address information from the ID field included in the sector from which the data read from the floppy disc and supplied from the demodulator 11, and supplies to the memory controller 15 the data from which the address information has been extracted, and the extracted address information. More specifically, the address separator 12 extracts ID information being an address information from the ID field included in the sector having the data stream read from the floppy disc and supplied from the demodulator 11, judges based on the extracted information whether the current data stream supplied from the demodulator 11 is ID information or not, and supplies to the memory controller 15 the result of the judgment and the data from which the address information has been extracted.

The address separator 12 is also supplied with index pulses each developed upon one fill turn of the floppy disc from the FDD 2.

The ID information contains a CRC number based on which it is judged during data write or read whether data write or read is currently being done to or from a destination sector.

The CRC check circuit 13 computes CRC information contained in data read from the floppy disc and supplied from the demodulator 11 to check whether error is contained in the data read from the floppy disc, and supplies the result of checking to the memory controller 15.

The buffer memory 14 is a First-In, First-Out (FIFO) type memory having a data storage capacity of at least one sector for data transfer between the FDD 2 and CPU 4 under the control of the memory controller 15. The buffer memory 14 stores data read from the floppy disc and supplied from the demodulator 11 or data supplied from the memory 5 via the system bus 6 and bus driver 19 and which is to be written to the floppy disc.

The FIFO memory is a memory from which data are read sequentially, starting with the first written one.

When the FDD 2 reads data from the floppy dis, the memory controller 15 allows the buffer memory 14, based on information supplied from the address separator 12 and CRC check circuit 13, to intermittently store data read sector by sector from the floppy disc and supplied to the buffer memory 14 from the FDD 2 via the demodulator 11. That is, the memory controller 15 allows the buffer memory 14, after one-sector data stored in the buffer memory 14 have entirely been transferred to the memory 5, to store a next one-sector data. Also, when the FDD 2 write data to the floppy disc, the memory controller 15 allows the buffer memory 14, based on control information from the CPU 4, to supply each one-sector data stored in the buffer memory 14 and which is to be written to the floppy disc to the FDD 2 via the CRC generator 16 and demodulator 17, and the FDD 2 to intermittently write the data sector by sector to the floppy disc. That is, the memory controller 15 allows the buffer memory 14 to supply one-sector data stored in the buffer memory 14 to the FDD 2 and then supply to the FDD 2 a next one-sector data supplied to the buffer memory 14 from the memory 5.

More specifically, when the FDD 2 reads data from the floppy disc, the memory controller 15 allows the FDD 2 to read one sector of data from the floppy disc, and supply the read one-sector data to the address separator 12, CRC check circuit 13 and buffer memory 14 via the demodulator 11.

Based on the one-sector data read by the FDD 2 from the floppy disc and supplied from the FDD 2, the address separator 12 and CRC check circuit 13 operate as in the above predetermined manners and supply information resulted from the predetermined operations to the memory controller 15. The memory controller 15 allows the buffer memory 14, based on the information supplied from the address separator 12 and CRC check circuit 13, to store the one-sector data read from the floppy disc and supplied to the buffer memory 14. Thereafter, the sequence controller 18 supplies the one-sector data stored in the buffer memory 14 to the memory 5 via the bus driver 19 and system bus 6.

Thus allowing the buffer memory 14 to be supplied with the one-sector data read from the floppy disc and not with any next one-sector data until the supplied one-sector data has been transferred to the memory 5, the memory controller 15 can allow the memory buffer 14 to intermittently store data read sector by sector from the floppy disc.

Also, when the FDD 2 writes data to the floppy disc, the memory controller 15 allows the buffer memory 14, based on the control information supplied from the CPU 4, to supply to the FDD 2 via the CRC check circuit 16 and modulator 17 one-sector data the memory 5 having been allowed by the sequence controller 18 to supply to the buffer memory 14 via the system bus 6 and bus driver 19 and which is to be written to the floppy disc. When supply of the one-sector data to the FDD 2 is complete, the memory controller 15 allows the memory 5 to supply the FDD 2 with a next one-sector data for transfer to the buffer memory 14 via the system bus 6 and bus driver 19.

The buffer memory 14 is not supplied with any further one-sector data from the memory 5 before supply of precedent one-sector data from the buffer memory 14 to the FDD 2 is complete. So, the memory controller 15 supplies the FDD 2 with sectors of data supplied from the buffer memory 14 and which are to be written to the floppy disc, thereby permitting to allow the FDD 2 to intermittently write the data sector by sector to the floppy disc.

Furthermore, the memory controller 15 allows the buffer memory 14 to convert 8-bit data stored therein to 16-bit data or 16-bit data to 8-bit data.

The memory controller 15 may be adapted to transfer data to the memory 5, etc. at the full speed of the system bus 6 via the bus driver 19 when the storage capacity of the buffer memory 14 has become smaller. Also the memory controller 15 may be adapted to allow the buffer memory 14 to store into the buffer memory 14 only data from which the ID has been excluded.

The CRC generator 16 computes data supplied from the buffer memory 14 in a predetermined manner, and supplies the computing result along with data supplied from the buffer memory 14 to the modulator 17.

After converting parallel data in bytes supplied from the CRC generator 16 to serial data, the modulator 17 modulates the converted serial data for write to the floppy disc, and supplies the modulated serial data to the FDD 2.

Based on commands supplied to the FDD 2 from the CPU 4 via the system bus 6, the sequence controller 18 controls the operation of the whole FDC 3 and issues a request for interrupt to the CPU 4.

The bus driver 19 serves also as an interface between the system bus 6 and FDC 3.

The FDD system 1 constructed as having been described in the foregoing functions as will be described below:

When the FDD 2 is not writing data to or reading data from the floppy disc, the FDC 3 allows a relatively long time transfer of data in units of sector between the FDD 2 and CPU 4.

More particularly, in the FDD system 1, data read by the FDD 2 from the floppy disc is supplied from the FDD 2 to the buffer memory 14 via the demodulator 11. The data is stored once in the buffer memory 14. The data thus stored once in the buffer memory 14 is supplied to the memory 5 via the bus driver 19 and system bus 6 when the FDD 2 is not writing data to, or reading data from, the floppy disc. Also in the FDD system 1, data the FDD 2 is allowed to write to the floppy disc is supplied once from the memory 5 to the buffer memory 14 via the system bus 6 and bus driver 19 and once stored in the buffer memory 14. The data thus stored once in the buffer memory 14 is supplied from the buffer memory 14 via the CRC generator 16 and modulator 17 to the FDD 2. Thus the data is written to the floppy disc by the FDD 2.

Next, in the FDD system 1, when the FDC 3 allows the FDD 2 to read data from the floppy disc or to write data to the floppy disc, the system bus 6 is occupied for data transfer among the FDD 2, FDC 3, CPU 4 and memory 5, which will be described with reference to FIG. 4.

Figure 4A:
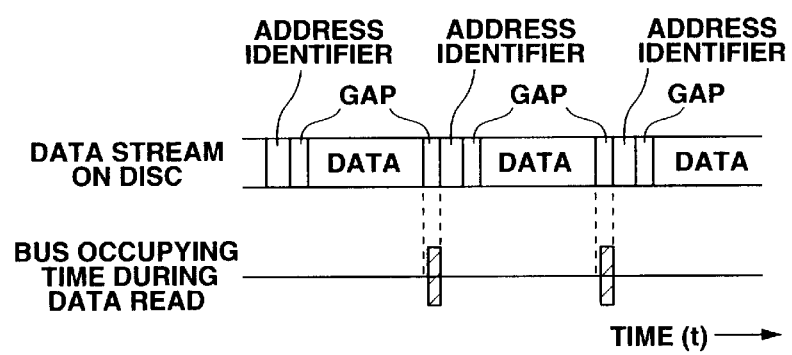
FIG. 4 shows the occupied stats of the system bus during data transfer under the control of the floppy disc controller according to the present invention.
Figure 4B:
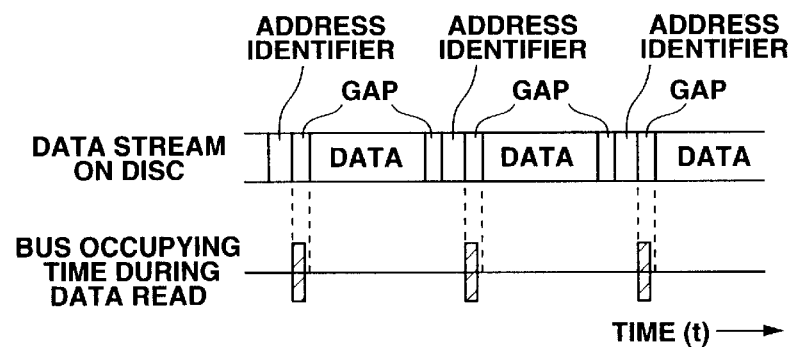

As shown in FIGS. 4A and 4B, the track on the floppy disc is divided into a plurality of sectors. Each sector records a predetermined byte count of data. Also, address information, error correction signal, gap for protection of each data area against a variation of the floppy disc rotation are provided before and after each byte string. After the FDD 2 reads data sector by sector from, or writes data sector by sector to, the floppy disc, the FDC 3 sends to and receives from the CPU 4 a data being in a burst status in which the data is divided in sectors.

Generally, while the system bus is being thus occupied, the FDC 3 reads and writes data from and to the floppy disc at a speed corresponding to the rotation speed of the floppy disc and it can read data even while the floppy disc is rotating at a nonuniform speed.

The FDC 3 according to the present invention supplies data to, and receives data from, the FDD 2 for a time between sectors on the floppy disc from or to which no data is being read or written. Thus, the FDC 3 occupies the system bus 6 for an extremely shorter time than in the prior art.

Figure 5:
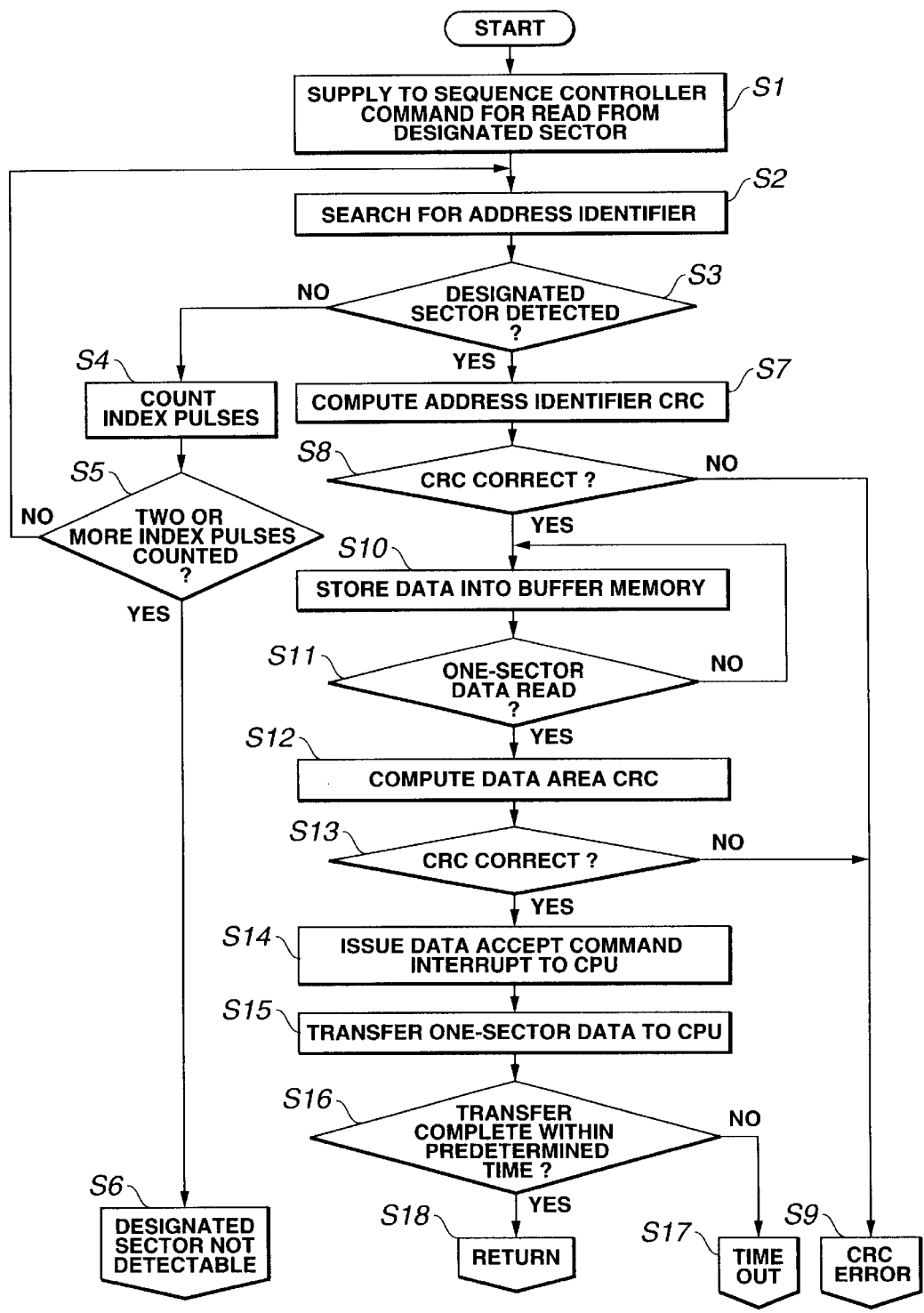
FIG. 5 is a flow chart of operations effected under the control of the floppy disc controller according to the present invention down to data read from a designated sector on a floppy disc.

Referring now to FIG. 5, there is shown a flow chart of operations effected in the FDD system 1 down to transfer to the memory 5 of data the FDC 3 has allowed the FDD 2 to read from a designated sector on the floppy disc.

The flow chart in FIG. 5 is based on the assumption that a series of preliminary operations such as initialization of the FDD system 1, start-up of the FDD 2, etc. has been completed.

First at step S1 in FIG. 5, the CPU 4 supplies to the sequence controller 18 of the FDC 3 via the system bus 6 a command including address information of a designated sector, containing a head number, track number, sector number, etc., and which instructs to read data from the designated sector. More particularly, the CPU 4 supplies to the sequence controller 18 via the system bus 6 and bus driver 19 a command for read of data from a sector 1 on a track 0 on a head 0, for example.

Next at step S2, the sequence controller 18 waits until an address identifier of a sector whose address coincides with the address information supplied from the CPU 4 is read from a data stream the FDD 2 has read from the floppy disk.

At step S3, the sequence controller 18 judges whether there has been detected the designated sector from the data the FDD 2 has read from the floppy disc.

When the sequence controller 18 decides that the designated sector has been detected, the operation goes to step S7.

On the other hand, when the sequence controller 18 does not decide that the designated sector has been detected, the operation goes to step S4.

At step S4, the sequence controller 18 counts index pulses.

At step S5, the sequence controller 18 judges whether two or more index pulses have been counted.

When the sequence controller 18 decides that two or more index pulses have not been counted, the operation goes back to step S2.

On the other hand, when the sequence controller 18 decides that two or more index pulses have been counted, the operation goes to step S6.

Next at step S6, the sequence controller 18 supplies to the CPU 4 an error signal that the designated sector cannot be detected with the currently positioned head. If the current head position is correct, the designated sector can be detected while the floppy disc is rotating one full turn. Unless the designated sector is detected before two index pulses are counted, the sequence controller 18 supplies to the CPU 4 the error signal that the designated sector cannot be detected with the currently positioned head.

At step S7, the demodulator 11 demodulates the serial data supplied from the FDD 2, converts it to a parallel data in bytes and supplies the converted data to the address separator 12, CRC check circuit 13 and buffer memory 14.

The CRC circuit 13 computes CRC of an address identifier coinciding with the CRC of the designated sector, contained in the data supplied from the demodulator 11.

Next at step S8, the CRC check circuit 13 judges whether the address identifier CRC supplied from the demodulator 11 coincides with the computed address identifier CRC.

When the CRC check circuit 13 decides that the address identifier CRC from the demodulator 11 coincides with the computed address identifier CRC and there is no error, the operation goes to step S10.

On the other hand, when the CRC check circuit 13 decides that the address identifier CRC from the demodulator 11 does not coincide with the computed address identifier CRC and there is an error, the operation goes to step S9.

At step S9, the CRC check circuit 13 supplies to the sequence controller 18 via the memory controller 15 and buffer memory 14 CRC error information that the floppy disc set in the FDD 2 is defective or that the data the FDD 2 has read from the floppy disc contains an error.

At step S10, the CRC check circuit 13 supplies to the memory controller 15 information that the floppy disc set in the FDD 2 is not defective and an address identifier. The memory controller 15 allows the buffer memory 14, based on the address identifier supplied from the CRC check circuit 13, to sequentially store date supplied from the demodulator 11.

Next at step S11, the memory controller 15 judges whether one sector of data supplied from the demodulator 11 has been stored in the buffer memory 14.

When the memory controller 15 decides that one sector of data supplied from the demodulator circuit 11 has not yet been stored in the buffer memory 14, the operation goes back to step S10.

On the other hand, when the memory controller 15 decides that one sector of data supplied from the demodulator circuit 11 has been stored in the buffer memory 14, the operation goes back to step S12.

At step S12, the CRC check circuit 13 computes CRC of data area contained in the data supplied from the demodulator 11.

Next at step S13, the CRC check circuit 13 judges whether the CRC of the data area contained in the data supplied from the demodulator 11 coincides with the computed data area CRC.

When the CRC check circuit 13 decides that the data area CRC does not coincide with the computer data area CRC and there exists an error, the operation goes to step S9.

On the other hand, when the CRC check circuit 13 decides that the data area CRC coincides with the computer data area CRC and there exists no error, the operation goes to step S14.

At step S14, the sequence controller 18 supplies to the CPU 4 an interrupt command for request for accepting the data stored in the buffer memory 14.

Receiving the interrupt command from the sequence controller 18, the CPU 4 will be able to continuously do any other process until it actually receives the interrupt command.

Next at step S15, the CPU 4 transfers, based on the interrupt command supplied from the sequence controller 18, one-sector data from the buffer memory 14 to a predetermined storage area in the memory 5 via the bus driver 19 and system bus 6 for a tune for which no data is being read from the floppy disc or for a time between sectors of byte strings of data recorded in the floppy disc. The data is transferred at a high speed determined by only the FDC 3, CPU 4 and memory 5 and not dependent upon the slow rotation of the floppy disc.

At step S16, the sequence controller 18 judges whether the data transfer from the CPU 4 to the memory 5 has been completed within a predetermined time.

When the sequence controller 18 decides that the data transfer from the CPU 4 to the memory 5 has been completed within the predetermined time, the operation goes to step S18.

On the other hand, when the sequence controller 18 decides that the data transfer from the CPU 4 to the memory 5 has not been completed within the predetermined time, a next sector data cannot be stored into the buffer memory 14 and so the operation goes to step S17. When the sequence controller 18 allows the FDD 2 to read data one after another from over a plurality of successive sectors on the floppy disc, the CPU 4 has to complete the data from the buffer memory 14 to the memory 5 via the bus driver 19 and system bus 6 before the FDD 2 is allowed to read the address identifier of a next sector.

At step S17, the sequence controller 18 supplies to the FDD 2 timeout error information which inhibits the FDD 2 from reading data from a next sector, while supplying to the CPU 4 timeout error information which aborts the data transfer from the buffer memory 14 to the memory 5 via the bus driver 19 and system bus 6.

At step S18, the sequence controller 18 judges whether data have been read from all the designated sectors.

When the sequence controller 18 decides that data have been read from all the designated sectors, the operation ends successfully.

On the other hand, when the sequence controller 18 decides that data have not been read from all the designated sectors, the operation goes back to step S1 for reading data from a next sector.

With the aforementioned operations, data transfer between the FDC 3 and memory 5, which takes a relatively long time, can be done sector by sector while the FDD 2 is not reading data from the floppy disc, and thus the load to the CPU 4 and system bus 6 can considerably be reduced.

Figure 6:
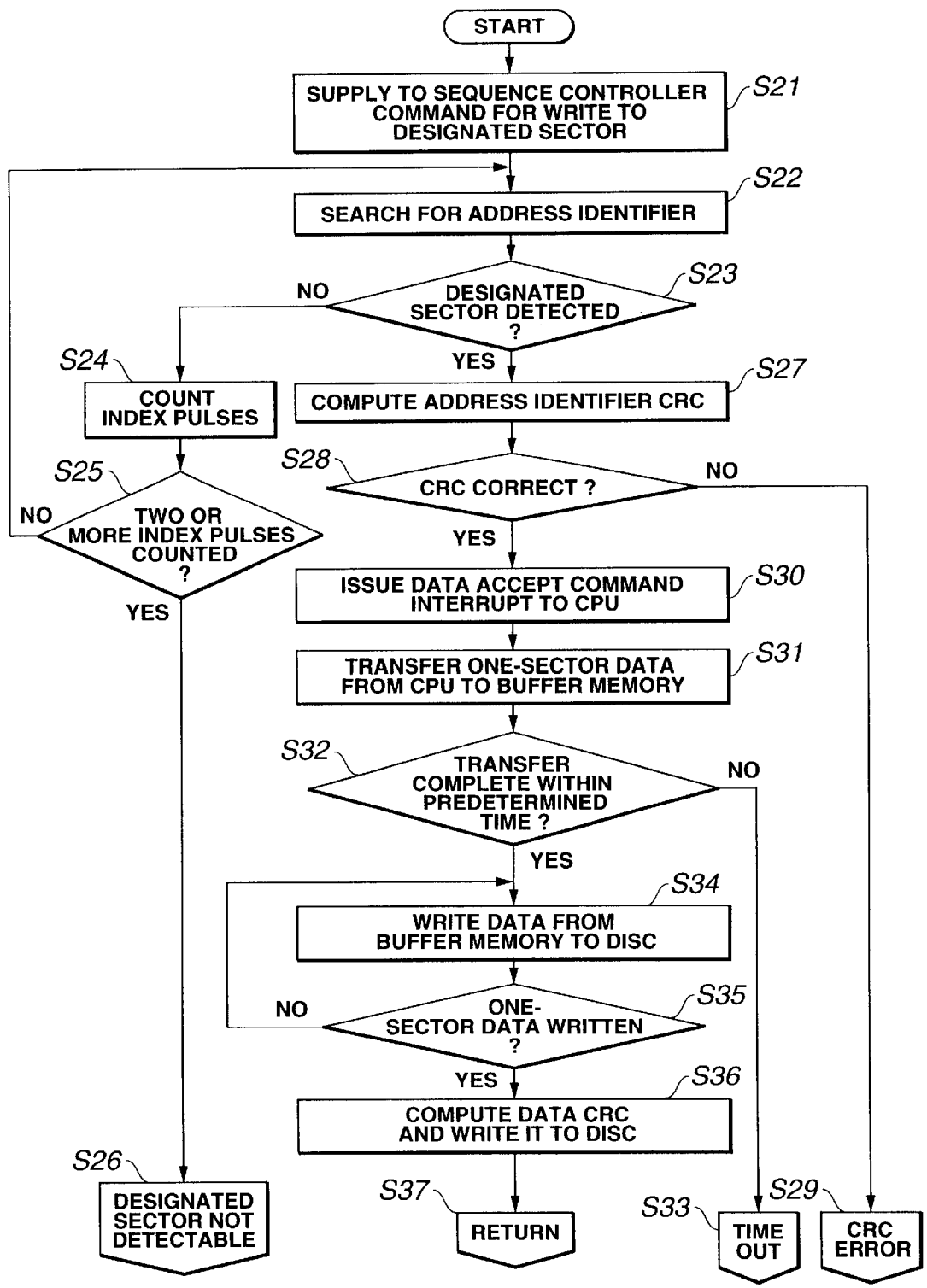
FIG. 6 is a flow chart of operations effected under the control of the floppy disc controller according to the present invention down to data write to a designated sector on a floppy disc.

Referring now to FIG. 6, there is shown a flow chart of operations effected in the FDD system 1 down to transfer to the FDD 2 of data the FDC 3 has allowed the FDD 2 to write to a designated sector on the floppy disc.

The flow chart in FIG. 6 is based on the assumption that a series of preliminary operations such as initialization of the FDD system 1, start-up of the FDD 2, etc. has been completed.

First at step S21 in FIG. 6, the CPU 4 supplies to the sequence controller 18 of the FDC 3 via the system bus 6 and bus driver 19 a command including address information of a designated sector, containing a head number, track number, sector number, etc., and which instructs to write data to the designated sector. More particularly, the CPU 4 supplies to the sequence controller 18 via the system bus 6 and bus driver 19 a command for write of data to a sector 1 on a track 0 on a head 0, for example.

Next at step S22, the sequence controller 18 searches in the data stored in the memory 5 data to be written to the floppy disc and including an address identifier of a sector whose address coincides with the address information supplied from the CPU 4.

At step S23, the sequence controller 18 judges whether a data to be written to the designated sector has been detected from the data stored in the memory 5 and which are to be written to the floppy disc.

When the sequence controller 18 decides that the data to be written to the designated sector has been detected, the operation goes to step S27.

On the other hand, when the sequence controller 18 does not decide that the data to be written to the designated sector has not been detected, the operation goes to step S24.

At step S24, the sequence controller 18 counts index pulses.

At step S25, the sequence controller 18 judges whether two or more index pulses have been counted.

When the sequence controller 18 decides that two or more index pulses have not been counted, the operation goes back to step S22.

On the other hand, when the sequence controller 18 decides that two or more index pulses have been counted, the operation goes to step S26.

Next at step S26, the sequence controller 18 supplies to the CPU 4 an error signal that the data to be written to the designated sector cannot be detected from the storage area of the memory 5 under retrieval.

At step S27, the sequence controller 18 computes CRC of an address identifier coinciding with the CRC of the designated sector, contained in the data supplied from the memory 5 via the system bus 6 and bus driver 19.

Next at step S28, the sequence controller 18 judges whether the address identifier CRC of the data supplied from the memory 5 coincides with the computed address identifier CRC.

When the sequence controller 18 decides that the address identifier CRC of the data from the memory 5 coincides with the computed address identifier CRC and there is no error, the operation goes to step S30.

On the other hand, when the sequence controller 18 decides that the address identifier CRC of the data from the memory 5 does not coincide with the computed address identifier CRC and there is an error, the operation goes to step S29.

At step S29, the sequence controller 18 supplies to the CPU 4 via the bus driver 19 and system bus 6 CRC error information that the storage area in the memory 5 is defective or that the data the FDD 2 is going to write to the floppy disc has an error.

At step S30, the sequence controller 18 supplies to the CPU 4 an interrupt command for requesting the buffer memory 14 to transfer one sector of data stored in the memory 5 and which is to be written by the FDD 2 to the floppy disc.

The CPU 4 will be able to continuously do any other process until it actually receives the interrupt command supplied from the sequence controller 18.

Next at step S31, the CPU 4 transfers, based on the interrupt command supplied from the sequence controller 18, one-sector data stored in a predetermined storage area in the memory 5 to the buffer memory 14 via the system bus 6 and bus driver 19. The data is transferred at a high speed determined by only the FDC 3, CPU 4 and memory 5 and not dependent upon the slow rotation of the floppy disc.

At step S32, the sequence controller 18 judges whether the data transfer from the CPU 4 to the buffer memory 14 has been completed within a predetermined time.

When the sequence controller 18 decides that the data transfer from the CPU 4 to the buffer memory 14 has been completed within the predetermined time, the operation goes to step S34.

On the other hand, when the sequence controller 18 decides that the data transfer from the CPU 4 to the buffer memory 14 has not been completed within the predetermined time, the operation goes to step S33.

At step S33, the sequence controller 18 supplies to the FDD 2 timeout error information which inhibits the FDD 2 from writing data to a next sector on the floppy disc, while supplying to the CPU 4 timeout error information which aborts the data transfer from the memory 5 to the buffer memory 14 via the system bus 6 and bus driver 19. That is, when the sequence controller 18 allows the FDD 2 to write data one after another to over a plurality of successive sectors on the floppy disc, the CPU 4 has to complete the transfer of the data stored in the memory 5 to the buffer memory 14 via the system bus 6 and bus driver 19 before a next data area in the floppy disc is reached.

At step S34, the memory controller 15 reads one-sector data from the buffer memory 14 and supplies it to the CRC generator 16. The CRC generator 16 computes the one-sector data supplied from the buffer memory 14 in a predetermined manner, and supplies the computed CRC information and one-sector data to the modulator 17. The modulator 17 converts the supplied one-sector data, namely, a parallel data for one sector of bytes, to a serial data, and modulates the converted serial data for write to the floppy disc.

The memory controller 15 allows the modulator 17 to supply the modulated serial data to the FDD 2. Further, the memory controller 15 allows the FDD 2 to write the modulated one-sector of serial data to the floppy disc at a speed corresponding to the rotating speed of the floppy disc for a time between sectors of byte strings of data to be written to the floppy disc.

At step S35, the memory controller 15 judges whether the FDD 2 has written the modulated one-sector serial data to the floppy disc.

When the memory controller 15 decides that the modulated one-sector serial data has not yet been written to the floppy disc, the operation goes back to step S34.

On the other hand, when the memory controller 15 decides that the modulated one-sector serial data has been written to the floppy disc, the operation goes back to step S36.

At step S36, the FDD 2 will write to the floppy disc the one-sector serial data followed by the CRC byte information computed by the CRC generator 16 at the speed corresponding to the rotating speed of the floppy disc.

Next at step S37, the sequence controller 18 judges whether all data have been written to the designated sector.

When the sequence controller 18 decides that all the data have been written to the designated sector, the operation ends successfully.

On the other hand, when the sequence controller 18 decides that all the data have not yet been written to the designated sector, the operation goes back to step S21 in order to write the remaining data to a next sector.

With the above operations, the data transfer between the FDC 3 and memory 5, which takes a relatively long time, can be done sector by sector when the FDD 2 is not writing data to the floppy disc, and thus the load to the CPU 4 and system bus 6 can considerably be reduced.

In the series of operations shown in the flow charts in FIGS. 5 and 6, the buffer memory 14 holds the same data capacity as the one-sector data amount. However, the buffer memory 14 may have a buffer capacity an integral number of times larger than the one-sector data amount. That is, when floppy discs having a wide variety of formats are to be controlled, the buffer memory 14 may hold a buffer capacity an integral number of times larger than the data capacity of the largest sector. Thus, by providing the buffer memory 14 holding a buffer capacity an integral number of times larger than the data capacity of each sector, the number of accesses to the CPU 4 can effectively be reduced and a memory having a redundant capacity is more economic.

In the series of operations shown in the flow chart shown in FIG. 6, the FDC 3 may be adapted to transfer a first data before a first sector is detected.

In the series of operations in the flow charts shown in FIGS. 5 and 6, data is transferred in bytes. However, since the system bus 6 has a width of several bytes, for example, as the case may be, data may be transferred bytes by bytes in one cycle correspondingly to the width of the system bus 6. Thus, the load to the FDD system 1 can further be reduced.

In the series of operations in the flow charts in FIGS. 5 and 6, the floppy disc is used as a recording medium. However, the recording medium may be any other disc than the floppy disc.

As having been described in the foregoing, in the FDD system 1 according to the present invention, when the FDD 2 having a relatively slow transfer speed is connected to the system bus 6, the system bus 6 will not be occupied for a long time. Namely, the system bus 6 can be used with a higher efficiency.

In the FDD system 1, the CPU 4 can process data in such a manner that the data will not easily be influenced by a jitter caused by the rotating speed of the floppy disc.

Further, in the FDD system 1 according to the present invention, the width of the system bus 6 can effectively be used for data transfer.

Moreover, in the FDD system 1 according to the present invention, even when a high speed drive is implemented by increasing the rotating speed of the floppy disc, the load to the CPU 4 will be increased only a little.

What is claimed is:

1. A disc controller for controlling the operation of a disc drive which reads and writes data from and to a disc, comprising:

means for storing data read from the disc and supplied from the disc drive or external data supplied via a bus for write to the disc, in units of a predetermined data amount being a unit in which the data is to be read from or written to the disc; and means for controlling the data read and write from and to the disc;

the controlling means intermittently reading the data for supply to the storing means from the disc in units of the predetermined data amount, and intermittently writing to the disc the data supplied from the storing means in units of the predetermined data amount; and while the disc drive is not reading or writing data from or to the disc, the controlling means supplying the data read from the disc and stored in the storing means to the bus in units of the predetermined data amount, and supplying the data for write to the disc from the bus to the storing means in units of the predetermined data amount;

such that the transfer of the data read from the disc and stored in the storing means to the bus and the transfer of the data for write to the disc from the bus to the storing means takes place during a period in which the disk drive is between the time when access to a prior unit of predetermined data amount is completed and the time when access to a next unit of predetermined data amount is initiated.

2. The disc controller as set forth in claim 1, wherein the storing means can store data in an amount an integral number of times larger than the predetermined data amount.

3. The disc controller as set forth in claim 1, wherein the controlling means converts the length of the data stored in the storing means to the width of the bus and provides the data as an output.

4. The disc controller as set forth in claim 1, wherein the predetermined data amount is the data amount of one sector on the disc.

5. The disc controller as set forth in claim 1, wherein the controlling means detects whether the storing means has stored data in units of the predetermined data amount, and supplies the data stored in the storing means to the disc or bus only when the storing means has stored the data in units of the predetermined data amount.

6. The disc controller as set forth in claim 1, further comprising means for detecting error in the data to be read or written, in units of the predetermined data amount, from or to the disc and address data of the data, the controlling means allowing the storing means to store the data only when the error detecting means has detected no error in the address data.

7. A disc control system for controlling a disc drive, comprising a disc controller and memory connected to each other by a bus, the disc controller controlling write of data stored in the memory to a disc and read of data from the disc for storage into the memory, the disc controller comprising:

means for storing data read from the disc and supplied from the disc drive or external data supplied via a bus and which is to be written to the disc, in units of a predetermined data amount being a unit in which the data is to be read from or written to the disc; and means for controlling the data read and write from and to the disc;

the controlling means intermittently reading the data for supply to the storing means from the disc in units of the predetermined data amount, and intermittently writing to the disc the data supplied form the storing means in units of the predetermined data amount; and while the disc drive is not reading-or writing data from or to the disc, the controlling means supplying the data read from the disc and stored in the storing means to the bus in units of the predetermined data amount, and supplying the data for write to the disc from the bus to the storing means in units of the predetermined data amount;

such that the transfer of the data read from the disc and stored in the storing means to the bus and the transfer of the data for write to the disc from the bus to the storing means takes place during a period in which the disk drive is between the time when access to a prior unit of predetermined data amount is completed and the time when access to a next unit of predetermined data amount is initiated.

8. The disc control system as set forth in claim 7, wherein the storing means can store data in an amount an integral number of times larger than the predetermined data amount.

9. The disc control system as set forth in claim 7, wherein the controlling means converts the length of the data stored in the storing means to the width of the bus and provides the data as an output.

10. The disc control system as set forth in claim 7, wherein the predetermined data amount is the data amount of one sector on the disc.

11. The disc control system as set forth in claim 7, wherein the controlling means detects whether the storing means has stored data in units of the predetermined data amount, and supplies the data stored in the storing means to the disc or bus only when the storing means has stored the data in units of the predetermined data amount.

12. The disc control system as set forth in claim 7, further comprising means for detecting error in the data to be read or written, in units of the predetermined data amount, from or to the disc and address data of the data, the controlling means controlling the storing means to store the data only when the error detecting means has detected no error in the address data.

13. A disc controlling method of controlling the operation of a disc drive which reads and writes data from and to a disc, the method comprising the steps of:

storing data read from the disc and supplied from the disc drive or external data supplied via a bus and which is to be written to the disc, in units of a predetermined data amount being a unit in which the data is to be read from or written to the disc;

intermittently reading the data for supply to the storing means from the disc in units of the predetermined data amount, or intermittently writing to the disc the data supplied from the storing means in units of the predetermined data amount; and supplying the data read from the disc and stored in the storing means to the bus in units of the predetermined data amount, and supplying the data for write to the disc from the bus to the storing means in units of the predetermined data amount, while the disc drive is not reading or writing data from or to the disc;

such that the transfer of the data read from the disc and stored in the storing means to the bus and the transfer of the data for write to the disc from the bus to the storing means takes place during a period in which the disk drive is between the time when access to a prior unit of predetermined data amount is completed and the time when access to a next unit of predetermined data amount is initiated.

14. The method as set forth in claim 13, wherein the storing means can store data in an amount an integral number of times larger than the predetermined data amount.

15. The method as set forth in claim 13, wherein the controlling means converts the length of the data stored in the storing means to the width of the bus and provides the data as an output.

16. The method as set forth in claim 13, wherein the predetermined data amount is the data amount of one sector on the disc.

17. The method as set forth in claim 13, wherein the controlling means detects whether the storing means has stored data in units of the predetermined data amount, and supplies the data stored in the storing means to the disc or bus only when the storing means has stored the data in units of the predetermined data amount.

18. The method as set forth in claim 13, further comprising the step of detecting error in the data to be read or written, in units of the predetermined data amount, from or to the disc and address data of the data, the controlling means controlling the storing means to store the data only when the error detecting means has detected no error in the address data.

* * * * *